United States Patent [19]

Gauld

[11] 4,374,728
[45] Feb. 22, 1983

[54] APPARATUS FOR SCREENING FIBROUS STOCK

[76] Inventor: W. Thomas Gauld, 4313 Winding Way, Mobile, Ala. 36609

[21] Appl. No.: 288,101

[22] Filed: Jul. 29, 1981

[51] Int. Cl.$^3$ ............................................. B07B 1/20
[52] U.S. Cl. ..................................... 209/273; 209/306
[58] Field of Search ....................... 209/273, 379, 306; 210/415

[56] References Cited

U.S. PATENT DOCUMENTS

| | | | |
|---|---|---|---|
| 772,373 | 10/1904 | Quiller | 209/306 X |
| 781,097 | 1/1905 | Ruth | 209/306 X |
| 1,134,304 | 4/1915 | Westbye | 209/206 X |
| 2,678,732 | 5/1954 | Banks | 210/415 |
| 3,029,951 | 4/1962 | Cannon | 209/273 X |
| 3,034,650 | 5/1962 | Szepan | 209/273 |
| 3,363,759 | 1/1968 | Clarke-Pounder | 210/415 X |
| 3,367,506 | 2/1968 | Rosaen | 210/415 X |
| 3,400,820 | 9/1968 | Nelson | 209/306 X |
| 3,637,077 | 1/1972 | Cowan | 209/306 |
| 3,785,495 | 1/1974 | Holtz | 209/306 X |
| 3,912,622 | 10/1975 | Bolton | 209/306 X |
| 4,097,376 | 6/1978 | Young | 209/379 |
| 4,234,417 | 11/1980 | Gauld | 209/273 |
| 4,267,035 | 5/1981 | Martin | 209/306 |

FOREIGN PATENT DOCUMENTS 153313  2/1903  Fed. Rep. of Germany ...... 209/306

*Primary Examiner*—Ralph J. Hill
*Attorney, Agent, or Firm*—Walker & McKenzie

[57] ABSTRACT

Baffles are added to the blade members of the rotor of an apparatus for screening fibrous stock to cause the flow of stock within the screening zone along the length of the blades to angle away from the blades rather than parallel with the blades. Passageways are added to allow untreated stock to be added at points deep within the screening zone to maintain a proper water to fiber ratio throughout the screening zone.

4 Claims, 6 Drawing Figures

APPARATUS FOR SCREENING FIBROUS STOCK

BACKGROUND OF THE INVENTION

1. Field of the Invention:

This invention relates generally to apparatuses for screening fibrous stock.

2. Description of the Prior Art:

The present invention is an improvement of the fibrous stock screen disclosed in U.S. Pat. No. 4,234,417. The above patent does not disclose or suggest the present invention.

SUMMARY OF THE INVENTION

The present invention is directed toward improving upon prior apparatuses for filtering fibrous stock slurries. The concept of the present invention is to improve the flow of stock through the apparatus.

The apparatus of the present invention includes, in general, a hollow housing member having an inlet port for allowing fibrous stock to be introduced into the interior thereof and having an outlet port for allowing screened fibrous stock to be discharged therefrom; a cylindrical, open ended screen member positioned within the housing member; the housing member including structure means for fixedly mounting the screen member within the housing member and for isolating the outer side of the screen member to divide the interior of the housing member into a first chamber and a second chamber with the boundary between the first and second chambers defined in part by the screen member, the inlet port communicating directly with the first chamber and the outlet port communicating directly with the second chamber; a rotatable shaft member located substantially along the longitudinal axis of the screen member; a rotor means causing fibrous stock within the first chamber to pass through the screen member into the second chamber and out the outlet port, the rotor means including a cylindrical body member fixedly attached to the shaft member for rotation therewith and including a plurality of blade members attached to and spaced substantially evenly about the circumference of the body member and radiating outwardly therefrom, each of the blade members having a leading side and a trailing side and having an outer side joining the leading and trailing side, the body member having a first end and a second end, the blade members extending between the first and second ends of the body member. One improvement of the present invention includes a plurality of baffle means attached to the trailing side of each of the blade members for directing the flow of fibrous stock within the first chamber. Another improvement of the present invention includes a plurality of passageway means for allowing a portion of the fibrous stock entering the inlet port to pass from the first end of the body member to a point between the first and second end of the body member.

In any pulp screening apparatus, either pressurized or free discharge units, stock enters an inlet area and travels axially along a screening surface with the acceptable portions of the stock passing through the screening surface and with the rejectable portions of the stock traveling along the inside surface of the screening surface and passing out of the apparatus through reject outlets. During the screening process, the liquid that accompanies the fiber stock passes through the screening surface at a faster rate than the fiber itself. Therefore, as the stock travels along the axial direction of the screening zone, it tends to increase in consistency which means that the fiber-to-water ratio is increased. If this ratio increases too much, the screening process will be slowed down or even interrupted by what is referred to as blinding or sealing. In order to prevent this from happening, it has been traditional to add extra water to the stock to replace some of the water that has passed through the screening surface and thereby maintain the proper screening consistency. Another method used to maintain the screening consistency is to intentionally feed the apparatus with over diluted stock so that the excess water at the inlet will be sufficient to allow for continuity of screening throughout the screening area. However, both the process of adding extra water during the screening and over diluting the stock at the start have undesirable effects such as diminishing the capacity of the screen by the amount of extra water added and decreasing the screening efficiency by increasing the amount of stock needed to be processed to obtain the same amount of acceptable material. One objective of the present invention is to overcome this problem.

DESCRIPTION OF THE PREFERRED EMBODIMENT

Figure 1:
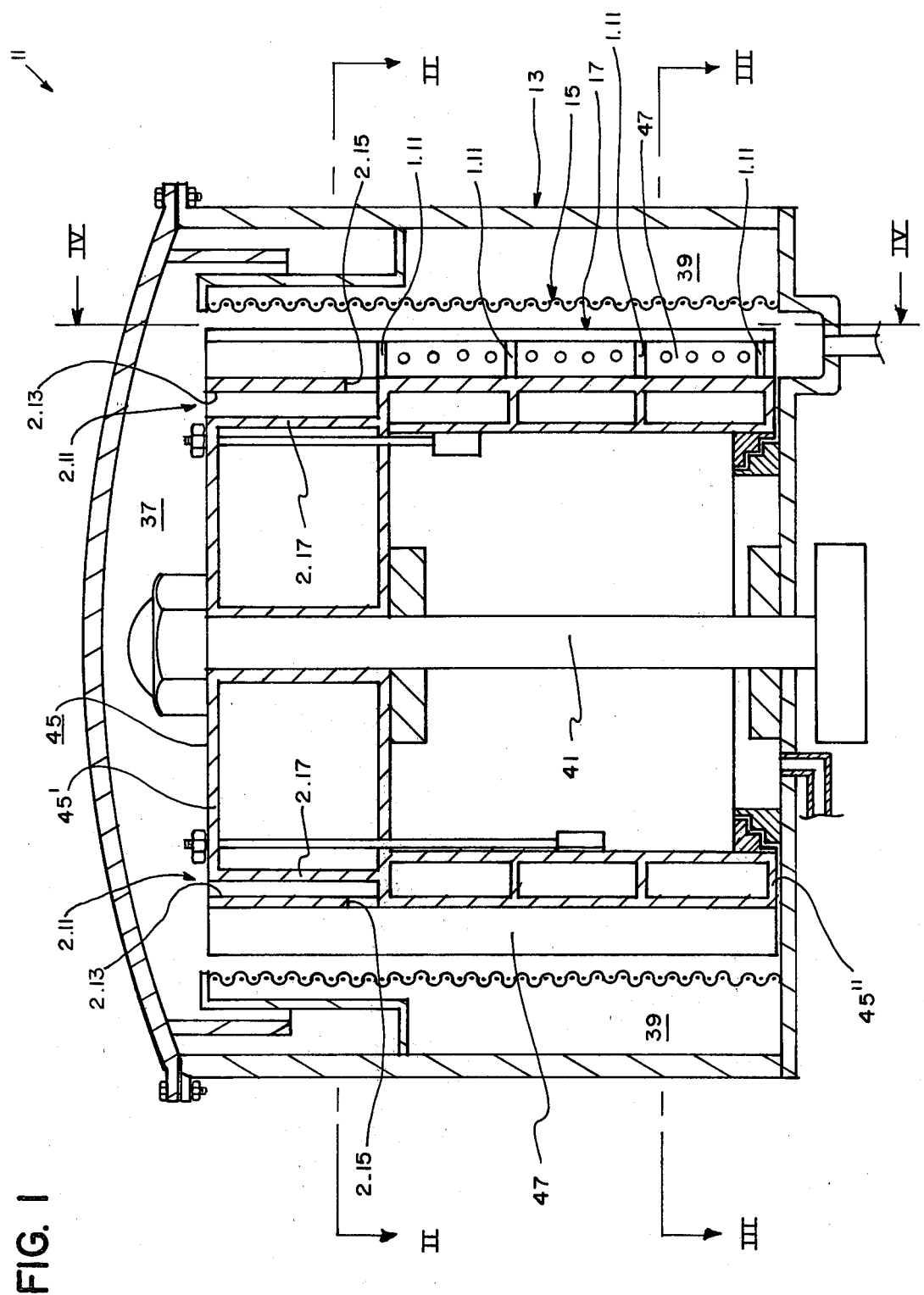
FIG. 1 is a sectional view of the improved apparatus for screening fibrous stock of the present invention.

The apparatus 11 is for screening fibrous stock slurries in order to separate any unacceptable, substantially large, substantially solid material therefrom. The apparatus 11 includes, in general, a hollow housing member 13, a cylindrical, open ended screen member 15 positioned within the housing member 13, and an impellar means 17 for causing fibrous stock to pass through the screen member 15. The housing member 13 has an inlet port 19 for allowing fibrous stock to be introduced into the interior thereof and has an outlet port 21 for allowing screened fibrous stock to be discharged therefrom. The housing member 13 includes structure means for fixedly mounting the screen member 15 within the housing member and for isolating the outer side of the screen member 15 to divide the interior of the housing member 13 into a first chamber 37 and a second chamber 39 with the boundary between the first and second chambers 37, 39 defined in part by the screen member 15. The inlet port 19 communicates directly with the first chamber 37 and the outlet port 21 communicates directly with the second chamber 39 so that the acceptable portions of any fibrous stock introduced through the inlet port 19 into the first chamber 37 will be caused by the impellar means 17 to pass through the screen member 15 into the second chamber 39 where it will pass out the housing member 13 through the outlet port 21.

Figure 2:
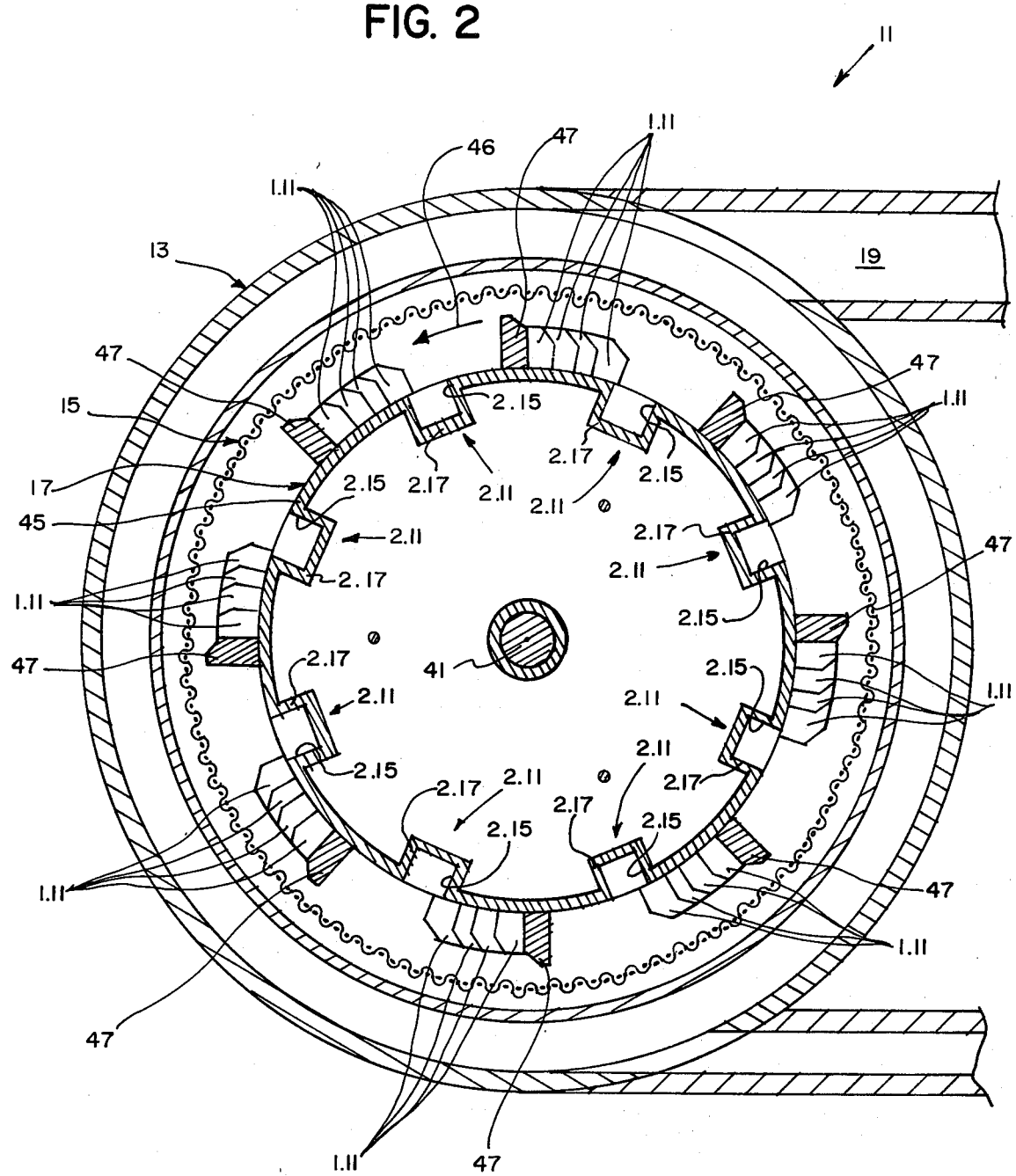
FIG. 2 is a sectional view as taken on line II—II of FIG. 1.
Figure 3:
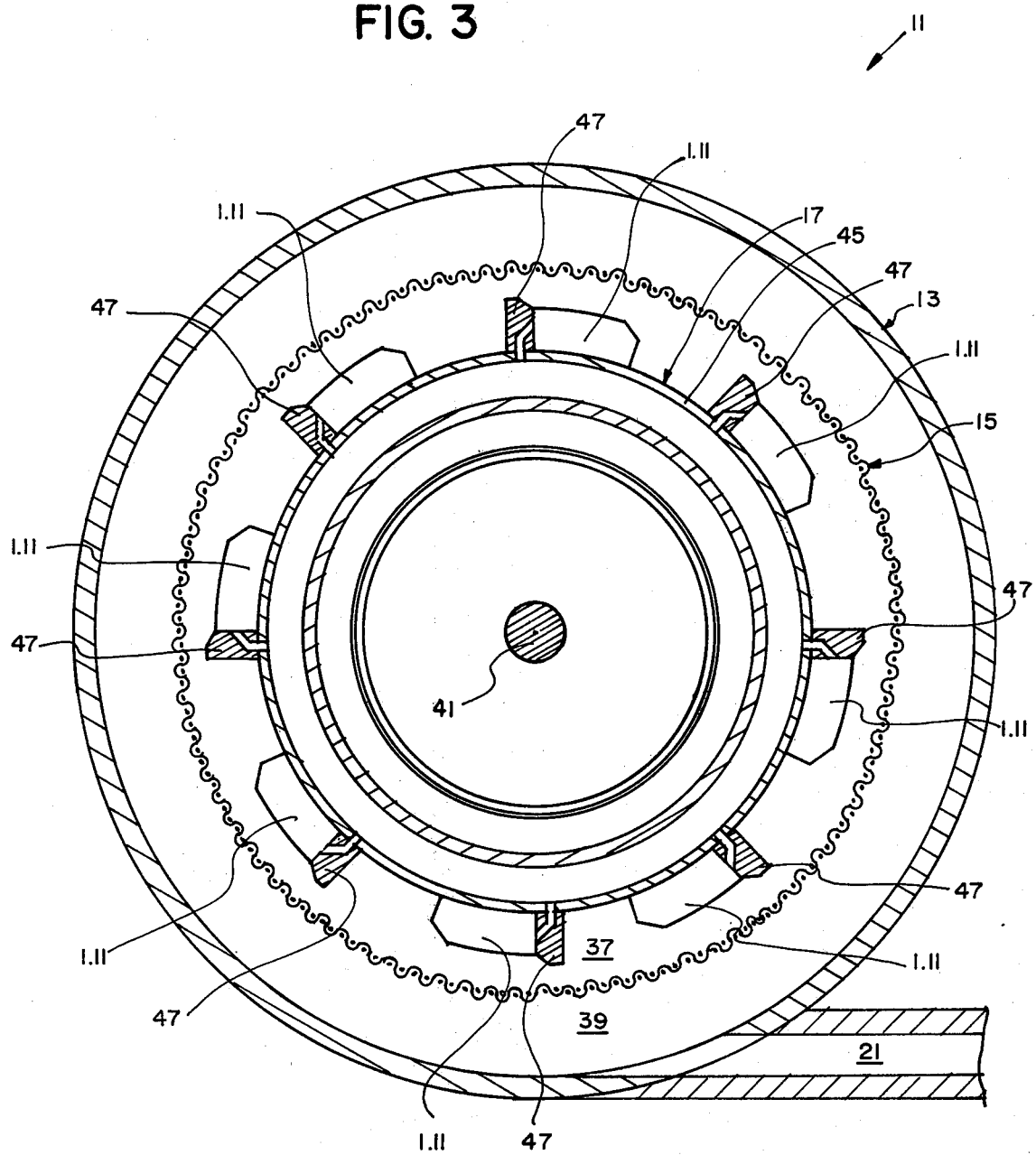
FIG. 3 is a sectional view as taken on line III—III of FIG. 1.

The impellar means 17 includes a rotatable shaft member 41 located substantially along the longitudinal axis of the screen member 15 and a rotor means for causing fibrous stock within the first chamber 37 to pass through the screen member 15 into the second chamber 39 and out the outlet port 21. The rotor means includes a cylindrical body member 45 fixedly attached to the shaft member 41 for rotation therewith in the direction indicated by the arrow 46 in FIG. 2, and includes a plurality of blade members 47 attached to and spaced substantially evenly about the circumference of the body member 45 and radiating outwardly therefrom. Each blade member 47 has a leading side 49 and a trailing side 51 and has an outer side 53 joining the leading and trailing sides 49, 51. The body member 45 preferably has a first end 45' and a second end 45". The blade members 47 preferably extend between the first and second ends 45', 45" of the body member 45. The actual construction and operation of such an apparatus 11 is fully and clearly disclosed in U.S. Pat. No. 4,234,417 and reference should be made to said U.S. Pat. No. 4,234,417 for a more complete understanding of the apparatus 11.

Figure 4:
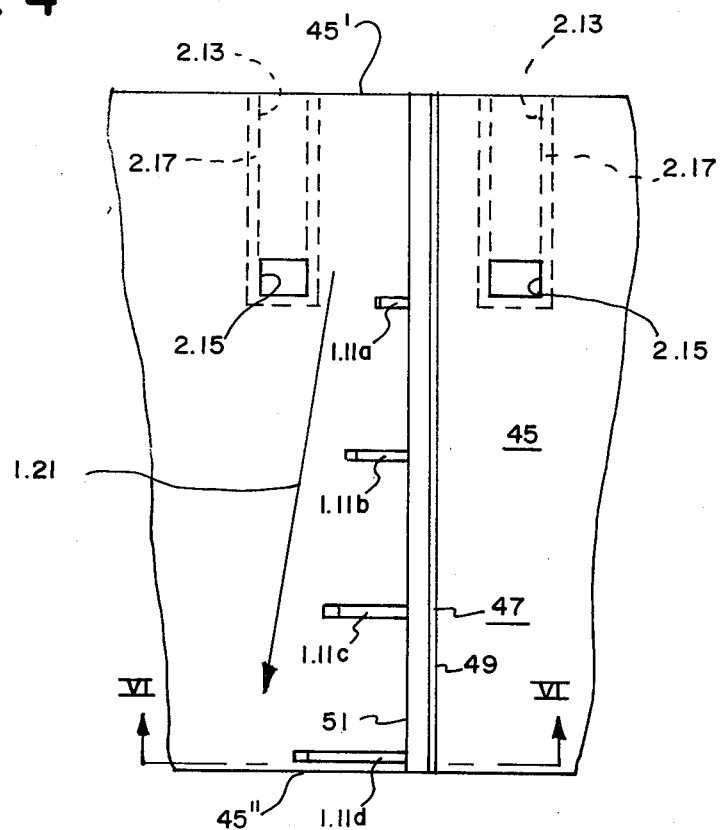
FIG. 4 is a somewhat diagrammatic view as taken on line IV—IV of FIG. 1 with portions broken away for clarity.
Figure 5:
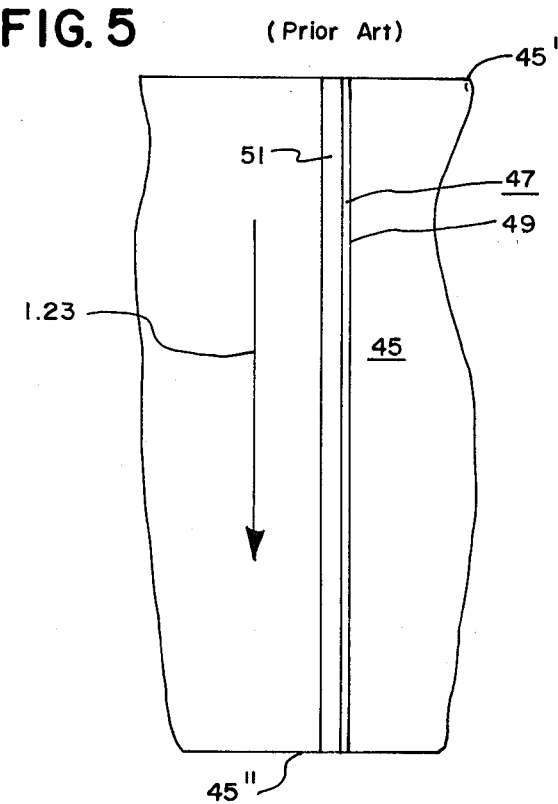
FIG. 5 is a view similar to FIG. 4 but of a prior art construction.
Figure 6:
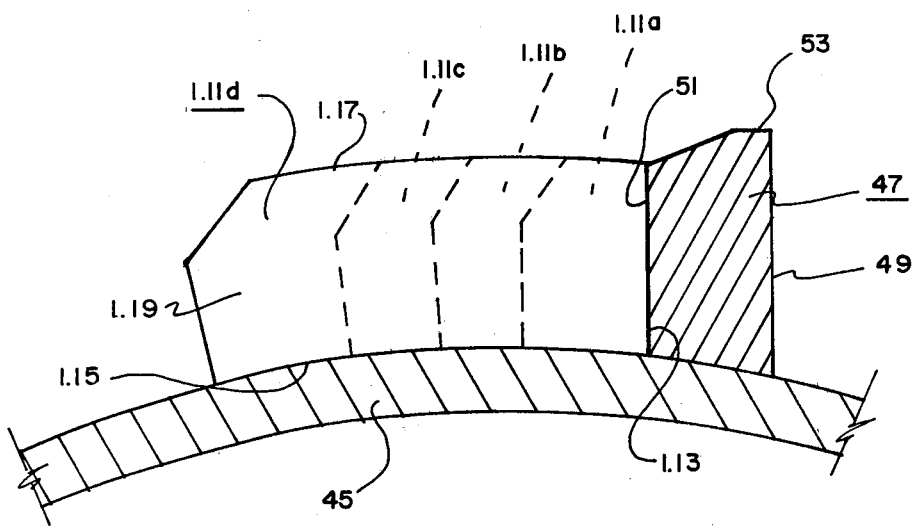
FIG. 6 is an enlarged sectional view as taken on line VI—VI of FIG. 4.

One improvement of the present invention includes a plurality of baffle means 1.11 attached to the trailing side 51 of each of the blade members 47 for directing the flow of fibrous stock within the first chamber. Each baffle means 1.11 preferably includes a forward side 1.13 for being attached to the trailing side 51 of the blade member 47, an inner side 1.15 for being attached to the outer circumference of the body member 45, an outer side 1.17, and a rearward side 1.19. The forward side 1.13 preferably extends farther from the inner side 1.15 than the rearward side 1.19. Thus, at least a portion of the outer side 1.17 of each baffle means 1.11 preferably slopes inwardly toward the body member 45 as it extends from the forward side 1.15 to the rearward side 1.19. The length of the baffle means 1.11 preferably increases as the distance from the first end 45' of the body member 45 increases. More specifically, FIG. 4 is a somewhat diagrammatic view looking directly into a blade member 47 and shows four baffle means, identified as 1.11a, 1.11b, 1.11c and 1.11d, attached thereto and clearly shows the length of the baffle means increasing the further away the baffle means is from the first end 45' of the body member 45. Thus, the length of the specific baffle means 1.11a that is closest to the first end 45 of the body member 45 is less than the next specific baffle means 1.11b which is, in turn, less than the next succeeding specific baffle means 1.11c which, in turn, is less than the next succeeding specific baffle means 1.11d as is clearly shown in FIG. 4. The reason for this arrangement of baffle means 1.11 is to cause the flow of stock from the first end 45' of the body member 45 to the second end 45" thereof to angle outward as shown by the arrow 1.21 in FIG. 4. FIG. 5 is a diagrammatic view somewhat similar to FIG. 4 but without the improvement of the baffle means 1.11 and the flow of stock from the first end 45' of the body means 45 to the second end 45" thereof is indicated by the arrow 1.23 as being substantially parallel with the blade member 47. The baffle means 1.11 may be constructed of any substantially rigid material such as metal and may be fixedly attached to the body member 45 and blade members 47 in any manner apparent to those skilled in the art such as by being welded thereto.

Another improvement of the present invention includes a plurality of passageway means 2.11 for allowing a portion of the fibrous stock entering the inlet port 19 to pass from the first end 45' of the body member 45 to a point between the first and second ends 45', 45" of the body member 45 thereby allowing the addition of untreated stock at points deeper in the axial direction of the screening zone. Each passageway means 2.11 preferably includes an opening 2.13 in the first end 45' of the body member 45, and opening 2.15 in the side wall of the body member 45 at a point between the first and second ends 45', 45" thereof, and a wall member 2.17 extending between the opening 2.13, 2.15 to form a closed passageway between the openings 2.13, 2.15 to allow fibrous stock to pass from a point in the first chamber adjacent the first end 45' of the body member 45 to a point in the first chamber 37 between the first and second ends 45', 45" of the body member 45. The passageway means 2.11 will allow untreated fibrous stock from the portion of the first chamber 37 adjacent the first end 45' of the body member 45 to be added to the partially treated fibrous stock at points deep in the axial direction of the screening zone (i.e., to be added back into the first chamber 37 at a point between the first and second ends 45', 45" of the body member 45) thus insuring a proper fiber-to-water ratio is maintain during the entire screening process.

As thus constructed and used, the improvement of the present invention provides an apparatus for screening fibrous stock in which the flow patterns and stock distribution within the screening zone is improved.

Although the invention has been described and illustrated with respect to a preferred embodiment thereof and a preferred use therefore, it is not to be so limited since changes and modifications may be made therein which are within the full intended scope of the invention.

I claim:

1. An improved apparatus for screening fibrous stock of the type including a hollow housing member having an inlet port for allowing fibrous stock to be introduced into the interior thereof and having an outlet port for allowing screened fibrous stock to be discharged therefrom; a cylindrical, open ended screen member positioned within said housing member; said housing member including structure means for fixedly mounting said screen member within said housing member and for isolating the outer side of said screen member to divide the interior of said housing member into a first chamber and a second chamber with the boundary between said first and second chambers defined in part by said screen member, said inlet port communicating directly with said first chamber and said outlet port communicating directly with said second chamber; a rotatable shaft member located substantially along the longitudinal axis of said screen member; a rotor means for causing fibrous stock within said first chamber to pass through said screen member into said second chamber and out said outlet port, said rotor means including a cylindrical body member fixedly attached to said shaft member for rotation therewith and including a plurality of blade members attached to and spaced substantially evenly about the circumference of said body member and radiating outwardly therefrom, each of said blade members having a leading side and a trailing side and having an outer side joining said leading and trailing sides, said body member having a substantially closed first end and a second end and a side wall, said blade members extending between said first and second ends of said body member; wherein the improvement comprises: a plurality of passageway means in said body member for allowing a portion of the fibrous stock entering said inlet port to pass from said first end of said body member to a point between said first and second ends of said body member, the combined cross-sectional area of said passageway means being greatly less than the cross-sectional area of said first end of said body member.

2. The improvement of claim 1 in which is included a plurality of baffle means attached to said trailing side of each of said blade members for directing the flow of fibrous stock within said first chamber.

3. The improvement of claim 2 in which said baffle means increase in length as the distance from said inlet port increases.

4. The improvement of claim 1 in which each of said passageway means has a first opening in said first end of said body member and a second opening in said side wall of said body member at a point between said first and second ends of said body member, each of said passageway means including a wall member extending between said first and second openings to form a closed passageway between said first and second openings to allow fibrous stock to pass from a point in said first chamber adjacent said first end of said body member to a point in said first chamber between said first and second ends of said body member to allow untreated fibrous stock from the portion of said first chamber adjacent said first end of said body member to be added to the partially treated fibrous stock at points deep in the axial direction of the screening zone.

* * * * *